(12) United States Patent
Eckhardt et al.

(10) Patent No.: US 7,796,113 B2
(45) Date of Patent: Sep. 14, 2010

(54) ARRANGEMENT HAVING A FLAT SCREEN PANEL ILLUMINATED WITH A BACK LIGHT THAT COMPENSATES FOR CHANGES IN LUMINANCE OF THE PANEL

(75) Inventors: Wolfgang Eckhardt, Weingarten (DE); Andreas Kärcher, Weingarten (DE)

(73) Assignee: EIZO GmbH (DE)

( * ) Notice: Subject to any disclaimer, the term of this patent is extended or adjusted under 35 U.S.C. 154(b) by 1002 days.

(21) Appl. No.: 10/557,529

(22) PCT Filed: May 19, 2004

(86) PCT No.: PCT/EP2004/005429

§ 371 (c)(1),
(2), (4) Date: Nov. 21, 2005

(87) PCT Pub. No.: WO2004/104976

PCT Pub. Date: Dec. 2, 2004

(65) Prior Publication Data

US 2007/0052659 A1    Mar. 8, 2007

(30) Foreign Application Priority Data

May 22, 2003   (DE) ................................ 103 23 221

(51) Int. Cl.
*G09G 3/36* (2006.01)
*G02F 1/1335* (2006.01)

(52) U.S. Cl. .......................... 345/102; 349/61; 349/199

(58) Field of Classification Search ................. 345/102; 349/61, 199
See application file for complete search history.

(56) References Cited

U.S. PATENT DOCUMENTS

| 6,795,137 B1* | 9/2004 | Whitted et al. ................ 349/68 |
| 2001/0008395 A1 | 7/2001 | Yamamoto et al. |
| 2002/0064037 A1 | 5/2002 | Lee |
| 2004/0246434 A1 | 12/2004 | Ohashi et al. |
| 2007/0085816 A1* | 4/2007 | Evanicky et al. ............ 345/102 |

FOREIGN PATENT DOCUMENTS

| DE | 199 35 458 A1 | 2/2001 |
| DE | 101 38 005 A1 | 2/2003 |
| EP | 0 861 017 A2 | 8/1998 |
| EP | 1 274 066 A1 | 1/2003 |
| EP | 1 445 643 A1 | 8/2004 |
| JP | 2002149135 A | 5/2002 |
| JP | 02258284 A | 9/2002 |
| WO | 03034131 A1 | 4/2003 |

* cited by examiner

*Primary Examiner*—David Nelms
*Assistant Examiner*—Nathanael R Briggs
(74) *Attorney, Agent, or Firm*—Ostrolenk Faber LLP

(57) ABSTRACT

The aim of the invention is to largely prevent certain influences from distributing the luminance of an image that can be reproduced on a panel of a flat screen. To this end, light-permeable parts are arranged between a sensor and a back light illuminating the panel from the rear, the ageing and/or temperature properties of said light-permeable parts essentially corresponding to those of the light-permeable parts of the panel.

9 Claims, 1 Drawing Sheet

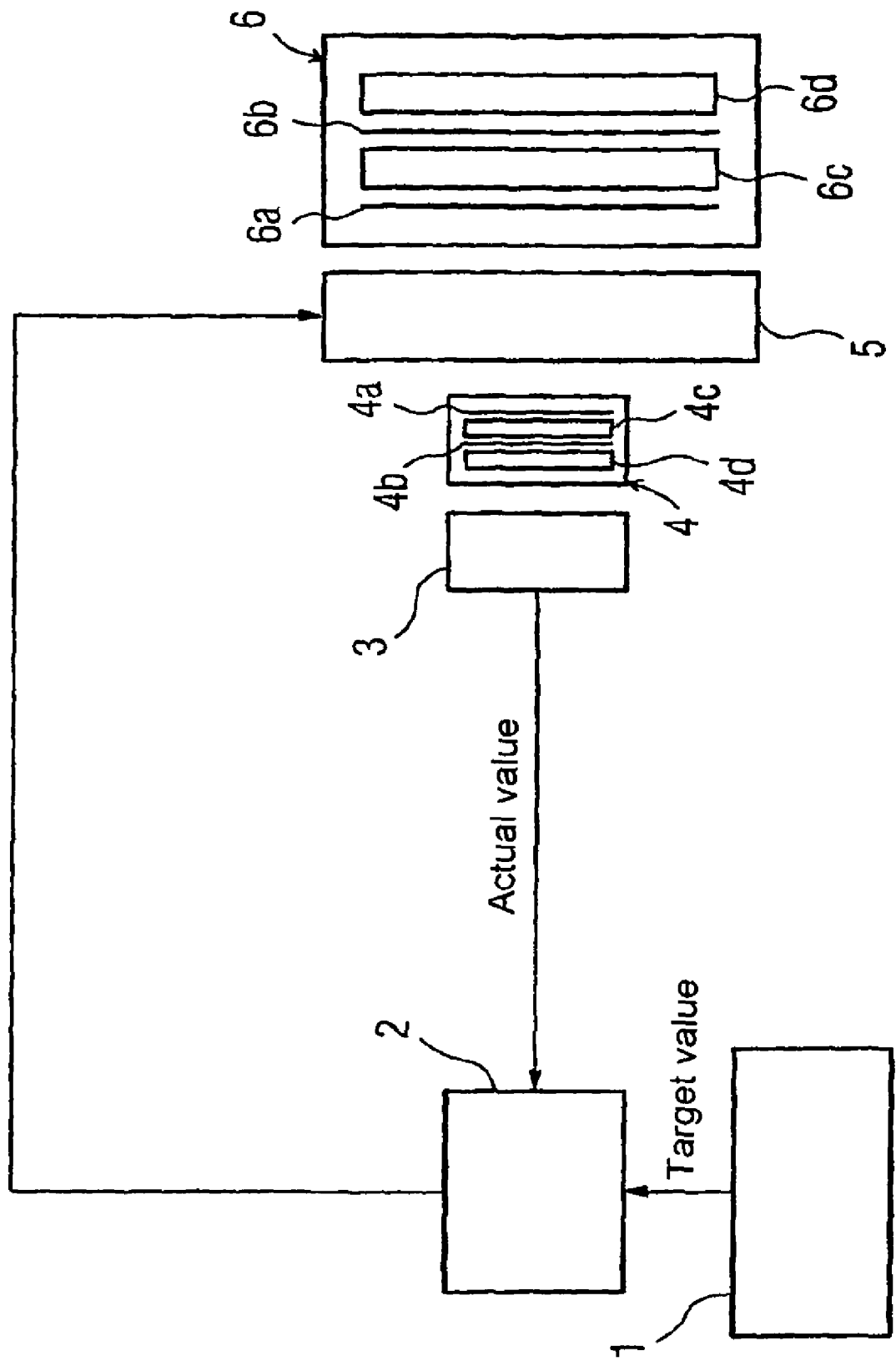

ARRANGEMENT HAVING A FLAT SCREEN PANEL ILLUMINATED WITH A BACK LIGHT THAT COMPENSATES FOR CHANGES IN LUMINANCE OF THE PANEL

CROSS REFERENCE TO RELATED APPLICATIONS

This application is the US National Stage of International Application No. PCT/EP2004/005429, filed May 19, 2004 and claims the benefit thereof. The International Application claims the benefits of German application No. 10323221.4, filed May 22, 2003, both applications are incorporated by reference herein in their entirety.

FIELD OF INVENTION

The invention relates to an arrangement comprising a panel pertaining to a flat screen which can be illuminated from the rear by the light of a back light, with a back light control adjusting the luminance detected by a sensor to a predefinable target value.

SUMMARY OF THE INVENTION

A back light control is normally provided for a so-called LCD panel (LCD display module) in order to control the luminance of the back light. This backlight control essentially adjusts the luminance of the back light detected by a sensor, the light of which illuminates the panel from the rear, to a constant target value. It is disadvantageous that this type of control only allows the luminance of the back light to be detected and regulated, influences disturbing the luminance of an image that can be reproduced on a panel are not detected and regulated. For instance, it is not possible to detect and correspondingly correct certain influences disturbing the luminance of the image as a result of ageing effects of the LCD fluid of the panel, the diffuser and/or polarization films.

The object of the present invention is to specify an arrangement of the type mentioned at the start which prevents certain influences from disturbing the luminance of an image that can be reproduced on a panel.

This object is achieved in that light-permeable parts are arranged between the back light and the sensor, the ageing and/or temperature properties of which essentially correspond to those of the light-permeable parts of the panel.

The parts arranged between the back light and sensor essentially correspond to the those of the panel with regard to physical structure and with regard to physical behaviour. On the one hand, the backlight illuminates the panel from the rear and on the other hand the parts arranged between the back light and the sensor, with which the sensor quasi detects disturbing ageing effects of these light-permeable parts of the panel with regard to the luminance, with the back light control correcting these disturbing ageing effects.

In one embodiment of the invention provision is made for light-permeable parts to only comprise diffuser and/or polarization films. These embodiments which can be easily implemented allow influences of temperature-dependent and ageing-dependent parts which disturb the luminance to be detected and corrected.

To further reduce certain influences from disturbing the luminance of an image that can be reproduced on a panel, provision is made according to another embodiment of the invention for the light-permeable parts to further comprise panel glass with LCD fluid, with which disturbing influences resulting from ageing and or temperature effects of the glass can be detected and corrected.

In a preferred embodiment of the invention, all light-permeable parts of a panel are taken into consideration and corresponding parts are arranged between the back light and sensor. This means that a 'small' panel (miniature panel) is arranged between the back light and sensor, with the size of the miniature panel corresponding approximately to the sensor size. No knowledge about the influence of the disturbances and/or knowledge about the properties of the panel is required, the backlight control corrects these disturbances.

The invention is described below in more detail with reference to an exemplary embodiment with regard to the only FIGURE in the drawing. The FIGURE in the drawing shows an arrangement for controlling the luminance of a panel.

BRIEF DESCRIPTION OF THE DRAWING

The sole FIGURE shows an exemplary arrangement for controlling the luminance of a panel.

DETAILED DESCRIPTION OF INVENTION

The number 1 indicates a graphics processor which provides the back light control 2 with a predefinable target value corresponding to a target luminance. A sensor unit 3 detects the luminance of light-permeable parts 4 and similarly transmits one of the actual values corresponding to this detected luminance to the backlight control 2, with this back light control 2 adjusting the intensity of the light of a back light 5 in accordance with the deviation of the target value from the actual value. The light of the back light 5 illuminates both an LCD panel 6 and also the light-permeable parts 4 from the rear, which are arranged between the sensor unit 3 and the back light 5 and the ageing and/or temperature properties of which essentially correspond to those of the light-permeable parts of the panel. With such an arrangement of the light-permeable parts 4 between the backlight 5 and the sensor unit 3, the sensor unit 3 detects the luminance of the light-permeable parts 4, which essentially correspond to the luminance of the panel 6. Disturbing ageing and/or temperature effects of the light-permeable parts of the panel 6 with regard to the luminance are thus also quasi detected, with the back light control 2 correcting these ageing and/or temperature effects and adjusting the luminance of an image that can be displayed on the panel 6 according to the target value.

In a simple embodiment, the light-permeable parts 4 comprise diffuser and/or polarization films 4a, 4b, which essentially correspond to the diffuser and/or polarization films 6a, 6b of the panel 6, with which temperature-dependent and ageing-dependent influences of these films which disturb the luminance of the panel are detected by the sensor unit 3 and are corrected by the back light control 2.

To further reduce certain influences from disturbing the luminance of an image that can be reproduced on the panel, the light-permeable parts 4 can further be provided with a glass 4c and LCD fluid 4d corresponding to the panel glass 6c and/or the LCD fluid 6d, with disturbing influences being able to be detected and corrected by virtue of the ageing effects of the glass and/or the LCD fluid.

The light-permeable parts 4 preferably correspond to all light-permeable parts of the panel. A miniature panel configured in this manner, the size of which corresponds to the size of the sensor, essentially allows disturbances to be corrected by virtue of the ageing and temperature effects of the panel. Knowledge about the influence of the disturbances and/or knowledge about the properties of the panel is not required, the backlight control corrects the disturbances.

The invention claimed is:

1. An arrangement comprising:
    a flat screen display panel having a viewing side, a back side and at least a first light-permeable layer between the viewing side and the back side;
    a back light illuminating the panel from the back side of the panel;
    a second light-permeable layer corresponding in at least one predetermined property to the first light-permeable layer;
    a sensor detecting a luminance of the back light through the second light-permeable layer but not through the first light-permeable layer;
    a back light control adjusting the luminance of the back light in accordance with the detected luminance of the sensor and a target luminance value.

2. The arrangement according to claim 1, wherein the first light-permeable layer and the second light-permeable layer each comprises a diffuser and a polarization film.

3. The arrangement according to claim 1, wherein the first light-permeable layer and the second light-permeable layer each comprises a glass and LCD fluid.

4. The arrangement according to claim 1, wherein the second light-permeable layer has a cross-sectional area less than a quarter of a cross-sectional area of the first light-permeable layer.

5. The arrangement according to claim 1, wherein a cross-sectional area of the second light-permeable layer essentially equals a luminance detecting area of the sensor.

6. The arrangement according to claim 1, wherein the detected luminance is a function of at least one predetermined property of the second light-permeable layer.

7. The arrangement according to claim 6, wherein the at least one predetermined property is at least one of a deterioration-dependent property and a temperature-dependent property.

8. The arrangement according to claim 6, wherein the predetermined property equates at least substantially to a corresponding predetermined property of the first light-permeable layer.

9. The arrangement according to claim 8, wherein the corresponding predetermined property is at least one of a deterioration-dependent property and a temperature-dependent property.

* * * * *